United States Patent
Shewmake

[19]

[11] Patent Number: 5,822,910

[45] Date of Patent: Oct. 20, 1998

[54] FISHING LINE TENSIONING DEVICE

[76] Inventor: I. W. Shewmake, 3641 E. Milton Rd., Tucson, Ariz. 85706

[21] Appl. No.: 942,949

[22] Filed: Oct. 2, 1997

[51] Int. Cl.$^6$ .................................................... A01K 97/00
[52] U.S. Cl. ...................................................... 43/25
[58] Field of Search ...................................... 43/25, 44.91

[56] References Cited

U.S. PATENT DOCUMENTS

| | | |
|---|---|---|
| 3,057,106 | 10/1962 | Wheeler ........................................ 43/25 |
| 4,015,362 | 4/1977 | Johnson ........................................ 43/25 |
| 4,854,069 | 8/1989 | Smith et al. ................................. 43/25 |

*Primary Examiner*—Thomas Price

[57] ABSTRACT

In its broadest terms, the present invention includes a major housing with a central bore running through its length. The tensioning device also includes a line guide which is interconnect to the major housing. The line guide also has a central bore which is adapted to be aligned with the central bore of the major housing. Additionally, the major housing also incorporates a tensioning device to apply tension to the fishing line running through the major housing. The device of the present device finds particular application in applying tension to a length of fishing line while such line is being wound upon the fishing reel.

5 Claims, 1 Drawing Sheet

FISHING LINE TENSIONING DEVICE

BACKGROUND OF THE INVENTION

1. Field of the Invention

The present invention relates to a fishing line tensioning device and more particularly pertains to such a device which is employed in winding line onto a fishing reel.

2. Description of the Prior Art

The use of tensioning devices is known in the prior art. More specifically, fishing line tensioning devices are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,003,153 to Khalil discloses a fishing rod mounted line detaining device. U.S. Pat. No. 4,156,9233 to Moore discloses a fishing line tensioning device. U.S. Pat. 5,029,409 to Nouwens discloses a fishing line loading device. U.S. Pat. No. 5,430,968 to Watkins discloses a control system for a fishing line. U.S. Pat. No. 4,656,772 to Lopez discloses a fishing device for manually controlling a fishing line. Lastly, U.S. Design Pat. No. 281,805 to Bolinger discloses a design for a fishing line strinke indicator.

In this respect, the fishing line tensioning device of the present invention substantially departs from the conventional concepts and designs of the prior art, and in so doing provides an apparatus primarily developed for the purpose of enabling fishing line to be wound upon a fishing reel.

Therefore, it can be appreciated that there exists a continuing need for device to facilitate winding fishing line upon a reel. In this regard, the present invention substantially fulfills this need.

SUMMARY OF THE INVENTION

In view of the foregoing disadvantages inherent in the known types of fishing line tensioning devices now present in the prior art, the present invention provides a means to evenly apply fishing line to a reel. As such, the general purpose of the present invention, which will be described subsequently in greater detail, is to enable fishing line to be evenly applied to a fishing reel.

To attain this, the present invention essentially comprises a major housing with a central bore running through its length. The tensioning device also includes a line guide which is interconnect to the major housing. The line guide also has a central bore which is adapted to be aligned with the central bore of the major housing. Additionally, the major housing also incorporates a tensioning means to apply tension to the fishing line running through the major housing. The device of the present device finds particular application in applying tension to a length Of fishing line while such line is being wound upon the fishing reel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing line tensioning device. Such device includes a cylindrical housing having a first end, a second end, and an outer periphery. A central bore is formed through the cylindrical housing from the first end to the second end. Additionally, a radial bore interconnects the central bore and the outer periphery of the cylindrical housing. The radial bore is threaded and has a lower end proximate to the central bore and an upper end proximate to the outer periphery of the cylindrical housing. A threaded plunger is threadably interconnected to the radial bore of the cylindrical housing. The threaded interconnection allows the plunger to be adjustably positioned within the radial bore. Additionally, a nylon element is positioned at the lower end of the radial bore. The threaded plunger functions to adjust the position of the element within the radial bore. A conical line guide has a first base end and a second apex end. A central bore interconnects the first and second ends of the conical line guide. The first base end is integral with the cylindrical housing. The present invention is adapted to be used upon a fishing pole defined by a length. A number of eyelets are formed along the length of the fishing pole. The conical line guide is positioned within one of the eyelets of the fishing pole. A length of fishing line is adapted to be threaded through the first end of the cylindrical housing and through the conical line guide. Additionally, the threaded plunger is adapted to be positioned such that the nylon element contacts the fishing line to provide a sufficient amount of tension within the line.

It is another object of the present invention to provide a tensioning device which can be easily secured to a fishing pole.

It is a further object of the present invention to provide a convenient means to apply fishing line to a fishing reel.

An even further object of the present invention is to provide a fishing tensioning device which is susceptible of a low cost of manufacture with regard to both materials and labor, and which accordingly is then susceptible of low prices of sale to the consuming public, thereby making such fishing line tensioning device economically available to the buying public.

Still yet another object of the present invention is to provide a fishing line tensioning device which provides in the apparatuses and methods of the prior art some of the advantages thereof while simultaneously overcoming some of the disadvantages normally associated therewith.

Still another object of the present invention is to provide a fishing line tensioning device wherein the tension applied to the line is easily adjusted.

Lastly, it is an object of the present invention to provide a new and improved fishing line tensioning device which is portable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than these set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
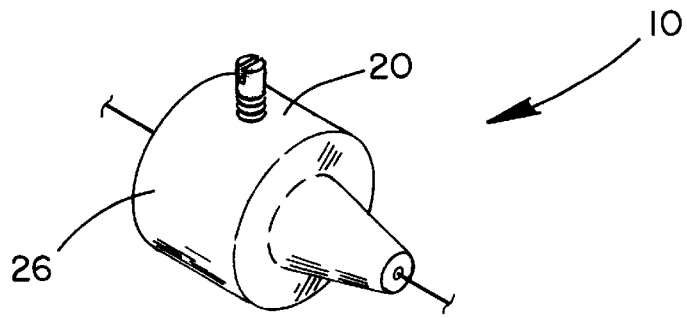
FIG. 1 is a perspective illustration of the device of the present invention.

With reference now to the drawings, and in particular to FIG. 1 thereof, the fishing line tensioning device of the present invention is depicted. In its broadest terms, the present invention includes a major housing with a central bore running through its length. The tensioning device also includes a line guide which forms a portion of the major housing. The line guide also has a central bore which is adapted to be aligned with the central bore of the major housing. Additionally, the major housing also incorporates a tensioning means to apply tension to the fishing line running through the major housing. The device of the present device finds particular application in applying tension to a length of fishing line while such line is being wound upon the fishing reel. The various components of the present invention, and the manner in which they interrelate, will be described in greater detail hereinafter.

Figure 2:
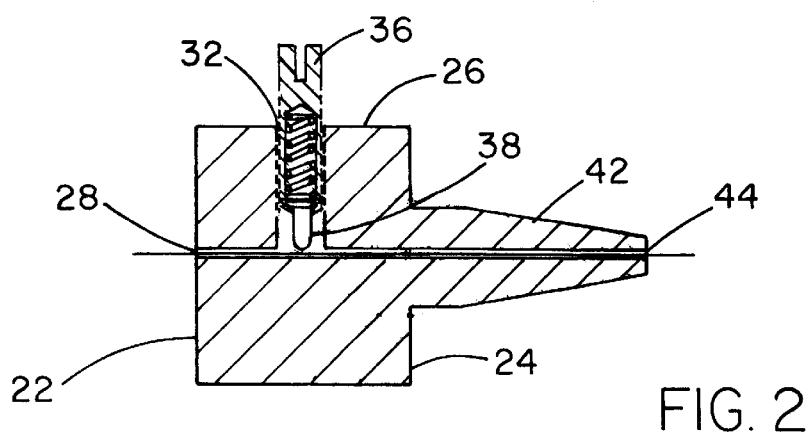
FIG. 2 is a sectional view of the tensioning device.
Figure 3:
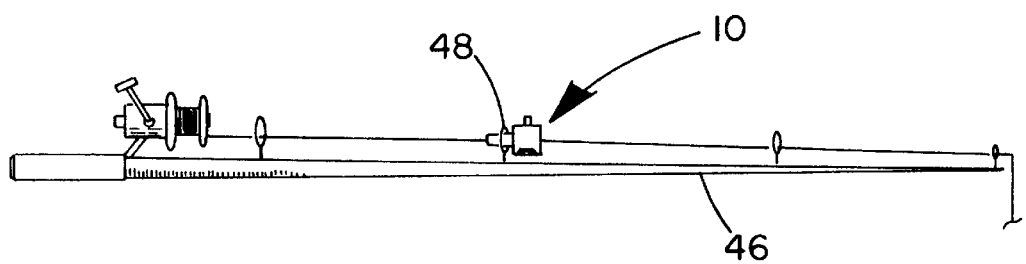
FIG. 3 is an illustration of the device in use.

The major component of the device 10 of the present invention is the cylindrical housing 20. This housing 20 is defined by a first end 22, a second end 24, and an outer periphery 26. As is illustrated in reference to FIG. 2, a central bore 28 is formed through the cylindrical housing 20 from the first end 22 to the second end 24. With continuing reference to FIG. 2, a radial bore 32 serves to interconnect the central bore 28 and the outer periphery 26 of the cylindrical housing 20. This radial bore 32 is threaded and defined by a lower end proximate to the central bore 28 and an upper end proximate to the outer periphery 26 of the cylindrical housing 20. The function of the radial bore 32 will be described in greater detail hereinafter.

The device of the present invention additionally includes a tensioning means. This tensioning means takes the form of a threaded plunger 36 with is threadably interconnected to the radial bore 32 of the cylindrical housing 20. This threaded interconnection allows the plunger 36 to be adjustably positioned within the radial bore 32. Additionally, an element 38 is positioned at the lower end of the radial bore 32. The element 38 functions to apply the tension directly to a segment of fishing line. In the preferred embodiment, the element 38 is formed of nylon. In operation, the threaded plunger 36 functions to adjust the position of the element 38 within the radial bore 32, thereby allowing adjustment of the amount of tension the element 38 applies to the fishing line.

The device of the present invention also includes a conical line guide 42. This line guide 42, in the preferred embodiment, has a first base end and a second apex end and a central bore 44 interconnecting the first and second ends. As is depicted in FIG. 2, the first base end is integral with the cylindrical housing 20.

As previously described, the present invention finds particular application in conjunction with a fishing pole 46. Namely, a fishing pole 46 defined by a length, and including number of eyelets 48 formed along the length of the fishing pole. In use, the conical line guide is positioned within one of the eyelets of the fishing pole. A length of fishing line is thus adapted to be threaded through the first end of the cylindrical housing and through the conical line guide. Furthermore, the threaded plunger is adapted to be positioned such that the nylon element contacts the fishing line to provide a sufficient amount of tension within the line. The fishing line then exits the second end of the conical line guide. The line is then secured to the dishing reel. With the following steps completed, the line can be taken up upon the fishing reel. The tensioning device ensures that an even tension is applied to the line as it is taken up upon the reel. Such even tension results in an even distribution, and tension, of line upon the reel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing line tensioning device comprising in combination:

a cylindrical housing having a first end, a second end, and an outer periphery, a central bore formed through the cylindrical housing from the first end to the second end, a radial bore interconnecting the central bore and the outer periphery of the cylindrical housing, the radial bore being threaded and having a lower end proximate to the central bore and an upper end proximate to the outer periphery of the cylindrical housing, a conical aperture formed within the second end of the cylindrical housing;

a threaded plunger threadably interconnected to the radial bore of the cylindrical housing, the threaded interconnection allowing the plunger to be adjustably positioned within the radial bore, a nylon ball positioned at the lower end of the radial bore, the threaded plunger functioning to adjust the position of the ball within the radial bore;

a conical line guide having a first base end and a second apex end, a central bore interconnecting the first and second ends of the conical line guide, the first base end interconnected to the conical aperture of the cylindrical housing;

a fishing pole having a length, a number of eyelets formed along the length of the fishing pole, the conical line guide positioned within one of the eyelets of the fishing pole;

a length of fishing line adapted to be threaded through the first end of the cylindrical housing and through the conical line guide, the threaded plunger functions to place the nylon ball in contact with the fishing line to provide a sufficient amount of tension within the line.

2. A fishing line tensioning device comprising in combination:

a housing having a first end, a second end, and an outer periphery, a central bore formed through the housing from the first end to the second end, a radial bore interconnecting the central bore and the outer periphery of the cylindrical housing, the radial bore having a lower end proximate to the central bore and an upper end proximate to the outer periphery of the housing, an aperture formed within the second end of the housing;

a plunger interconnected to the radial bore of the housing, the interconnection allowing the plunger to be adjustably positioned within the radial bore, an element positioned at the lower end of the radial bore, the plunger functioning to adjust the position of the element within the radial bore;

a conical line guide having a first base end and a second apex end, a central bore interconnecting the first and second ends of the conical line guide, the first base end integral with the housing.

3. The fishing line tensioning device as described in claim 2 further comprising:

a fishing pole having a length, a number of eyelets formed along the length of the fishing pole, the conical line guide positioned within one of the eyelets of the fishing pole;

a length of fishing line adapted to be threaded through the first end of the cylindrical housing and through the conical line guide, the threaded plunger functions to place the ball in contact with the fishing line to provide a sufficient amount of tension within the line.

4. The fishing line tensioning device as described in claim 2 wherein:

the element is formed of a nylon material.

5. The fishing line tensioning device as described in claim 2 wherein:

the radial bore and the plunger are threadably interconnected.

\* \* \* \* \*